Jan. 17, 1939. J. FOLK 2,144,259
SUBSTANCE SUPPORT
Filed April 2, 1934 9 Sheets-Sheet 2
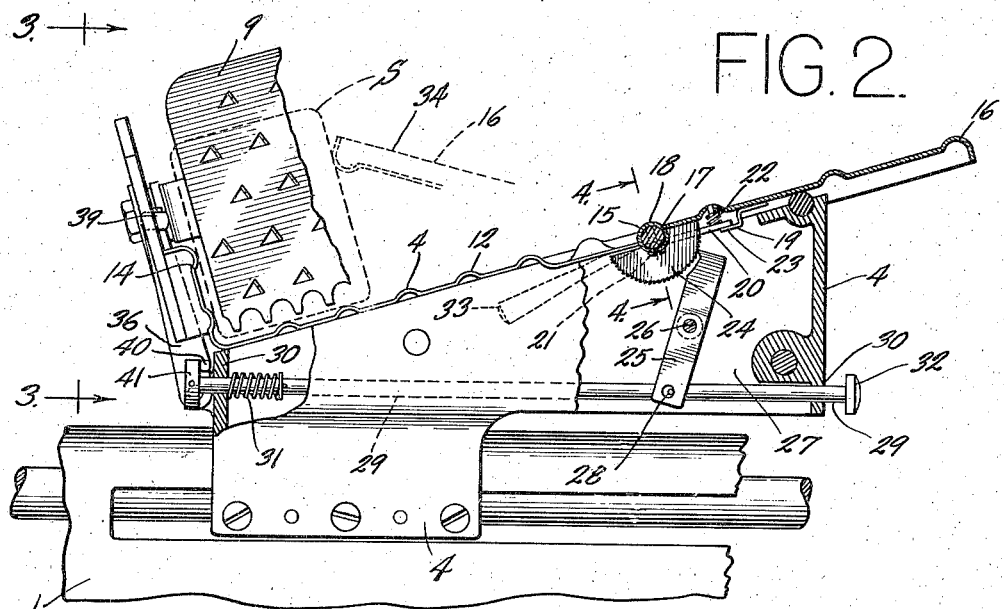
FIG. 2.
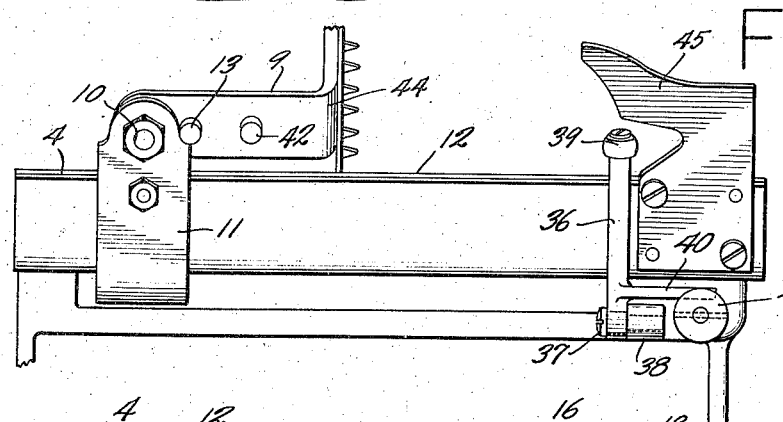
FIG. 3.
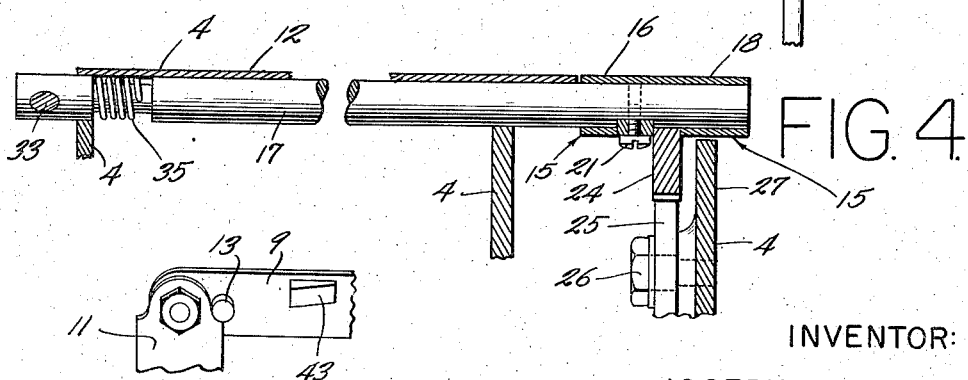
FIG. 4.
FIG. 5.
INVENTOR:
JOSEPH FOLK
BY Cox & Moore
ATT'YS.

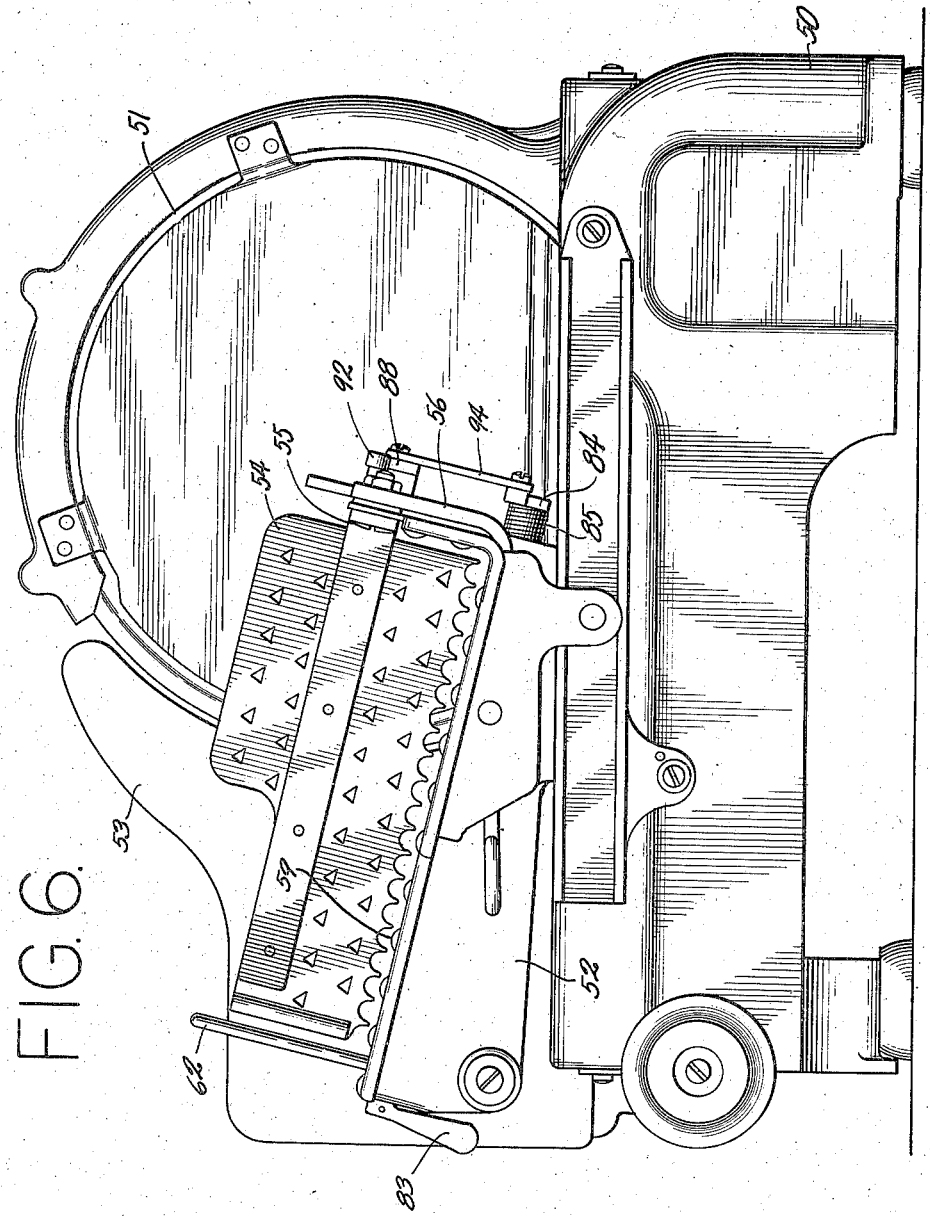

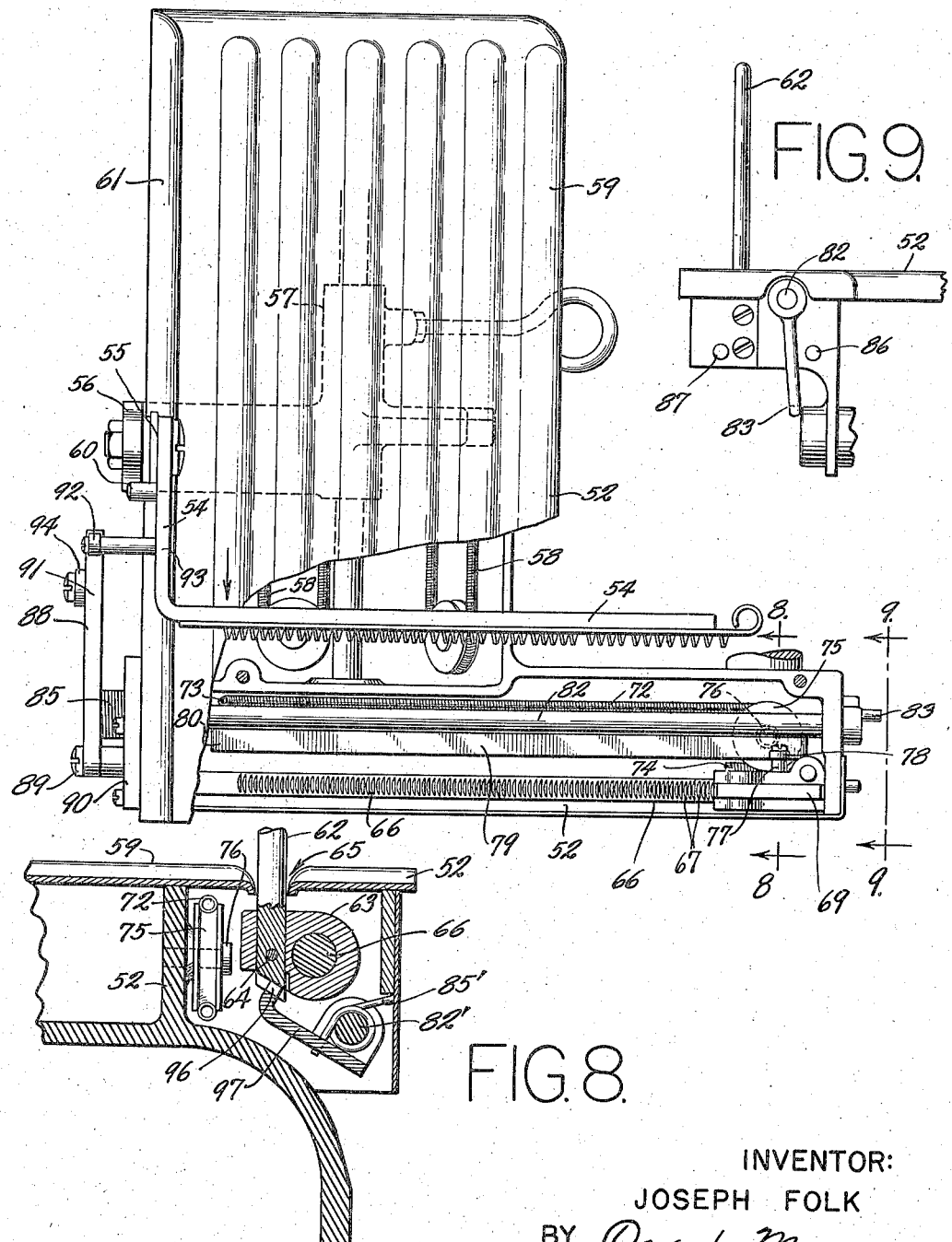

Jan. 17, 1939.                J. FOLK                2,144,259
                          SUBSTANCE SUPPORT
                        Filed April 2, 1934           9 Sheets-Sheet 5
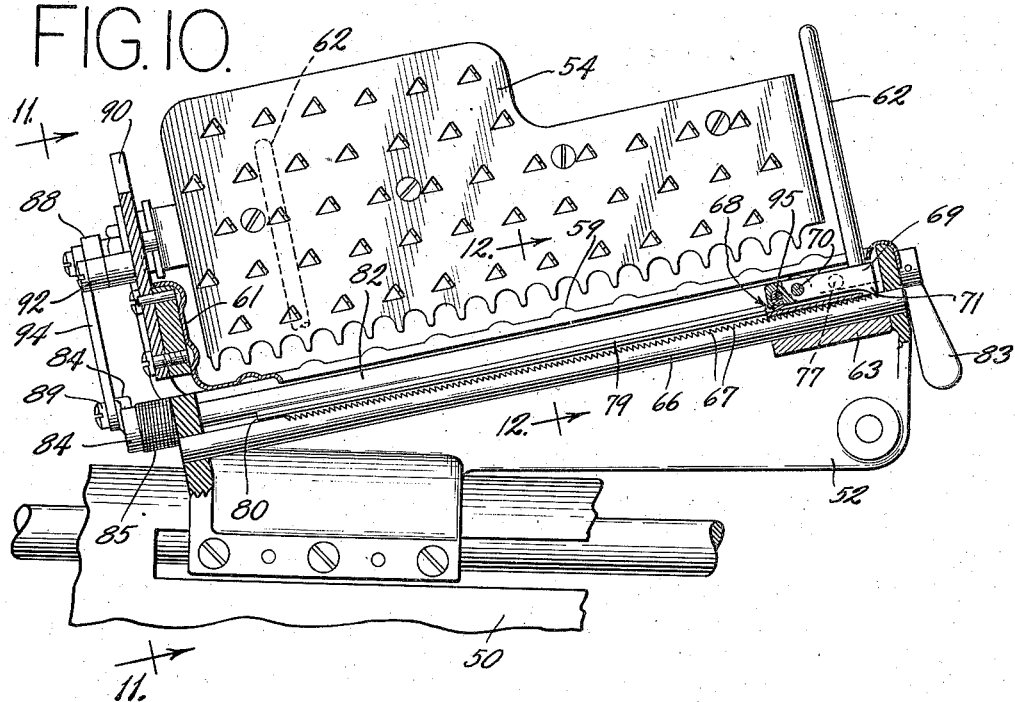
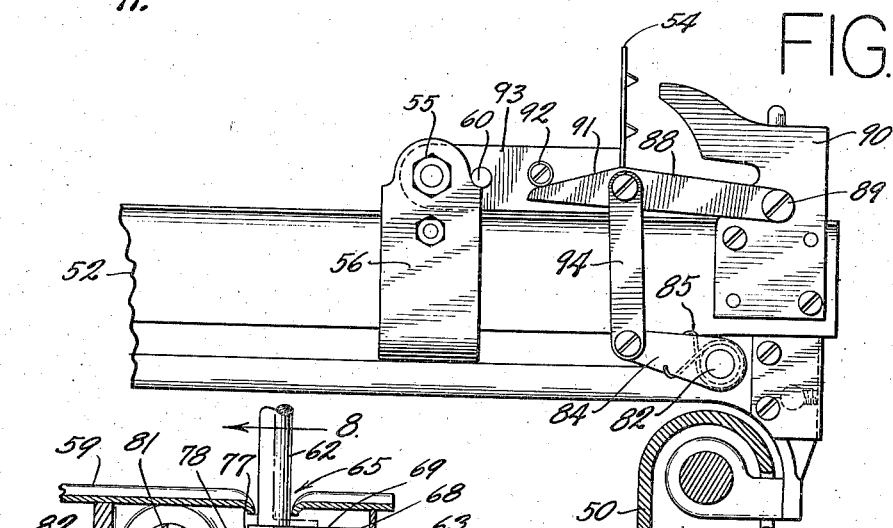
INVENTOR:
JOSEPH FOLK
BY Cox & Moore,
ATT'YS.

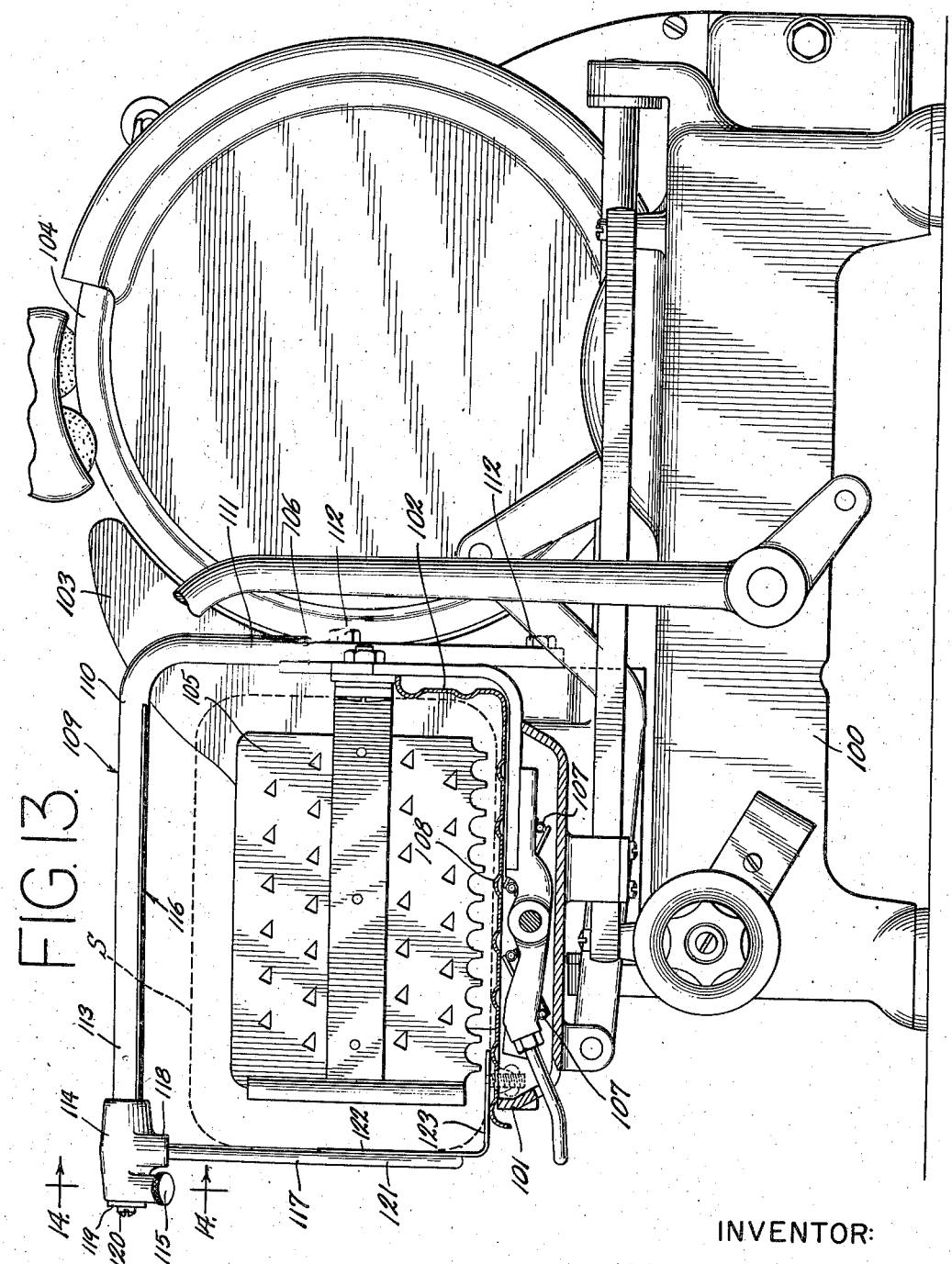

Jan. 17, 1939. J. FOLK 2,144,259
SUBSTANCE SUPPORT
Filed April 2, 1934 9 Sheets-Sheet 7
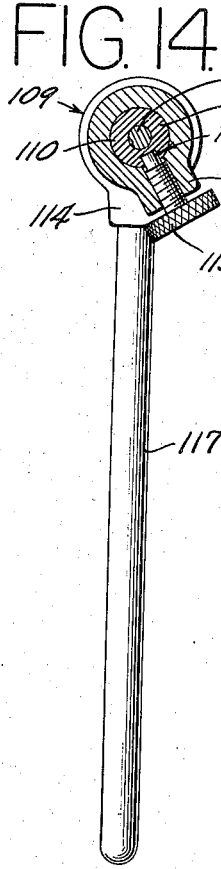
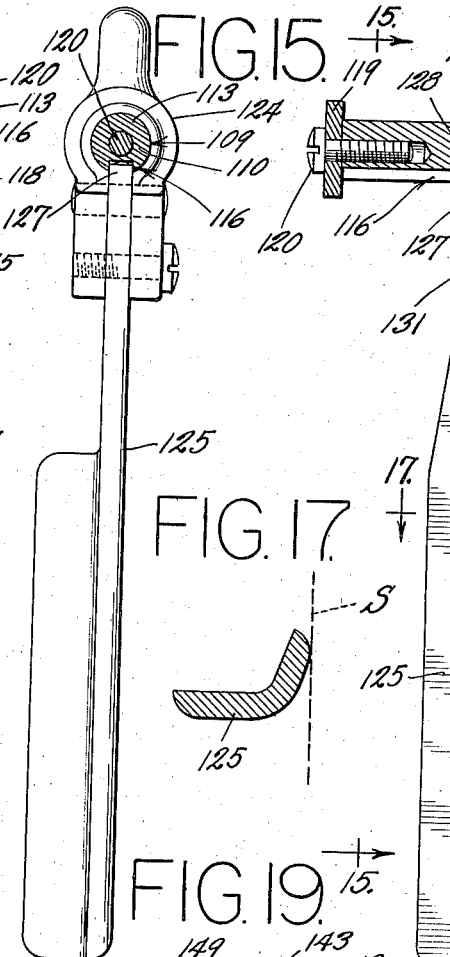
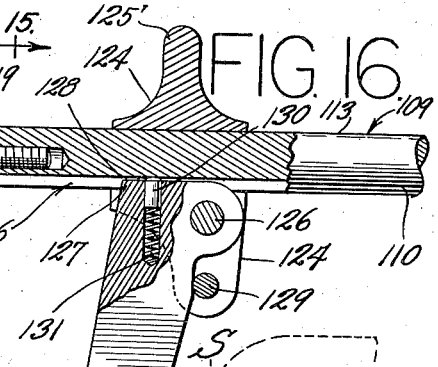
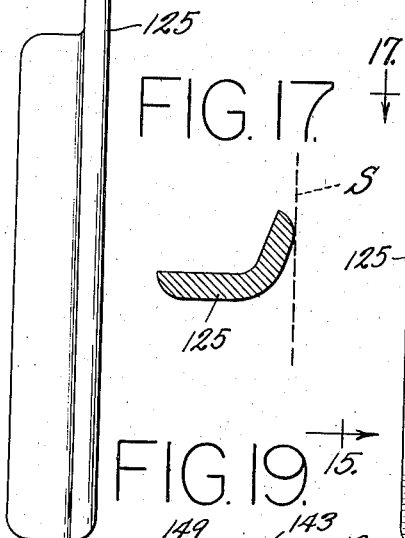
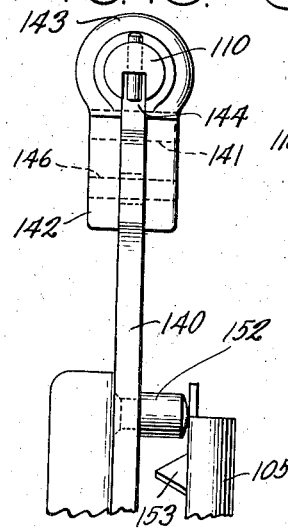
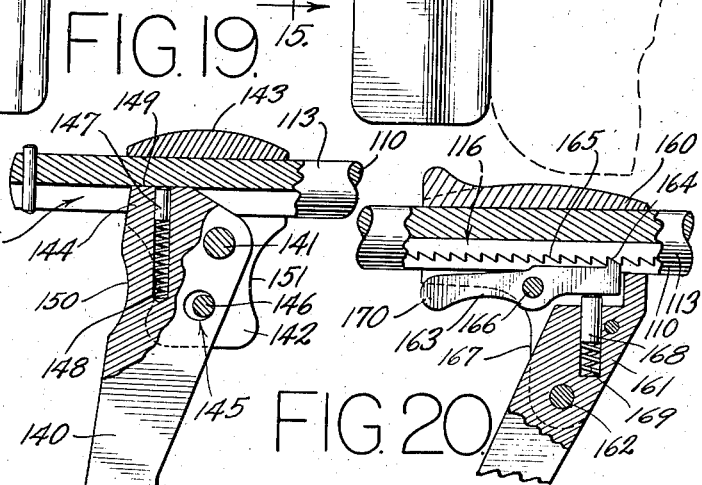
INVENTOR:
JOSEPH FOLK
BY Cox & Moore
ATT'YS.

Jan. 17, 1939.    J. FOLK    2,144,259
SUBSTANCE SUPPORT
Filed April 2, 1934    9 Sheets-Sheet 8
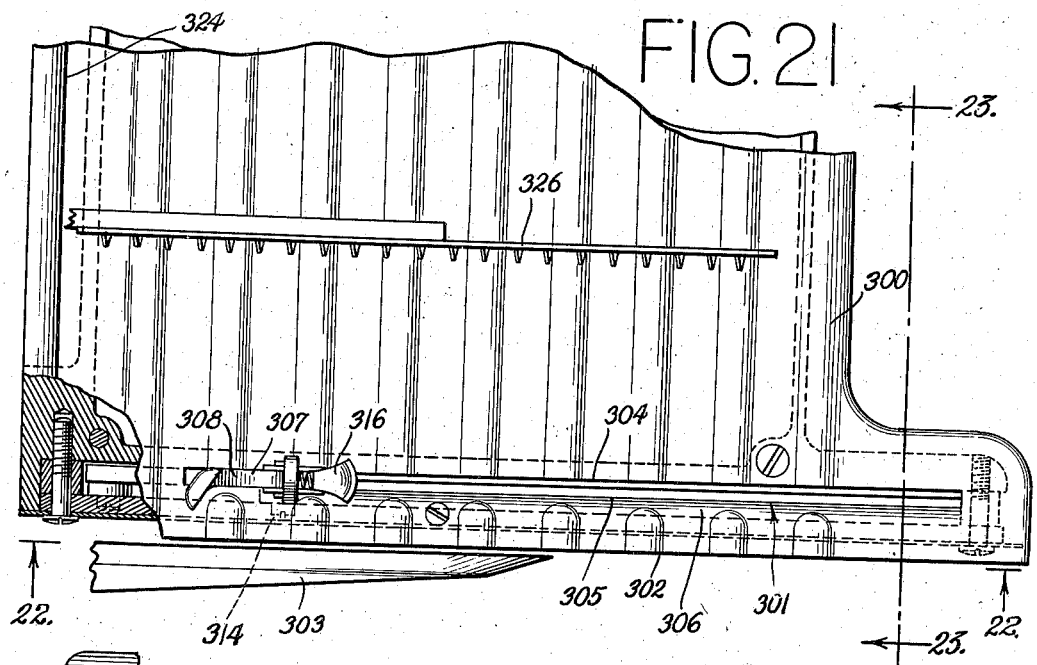
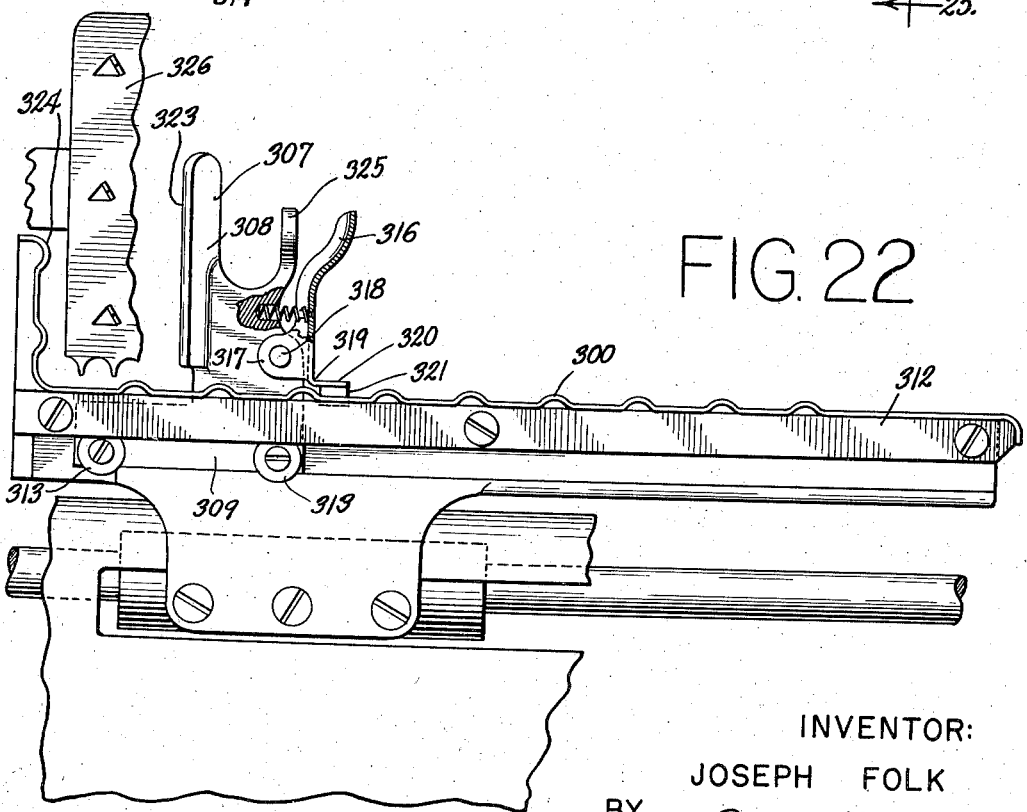
INVENTOR:
JOSEPH FOLK
BY Cox & Moore
ATT'YS.

Jan. 17, 1939.  J. FOLK  2,144,259
SUBSTANCE SUPPORT
Filed April 2, 1934  9 Sheets-Sheet 9

INVENTOR:
JOSEPH FOLK
BY Cox & Moore
ATT'YS.

Patented Jan. 17, 1939

2,144,259

UNITED STATES PATENT OFFICE 2,144,259

SUBSTANCE SUPPORT

Joseph Folk, La Porte, Ind., assignor to U. S. Slicing Machine Company, La Porte, Ind., a corporation of Indiana Application April 2, 1934, Serial No. 718,581

19 Claims. (Cl. 146—102)

This invention relates to slicing machines, and particularly to instrumentality for holding the substance to be sliced in proper position on the food support. More specifically the invention relates to a device or abutment commonly termed a "ham support" to maintain the substance to be sliced, such as meat, bread and the like, in proper position to have slices cut therefrom and to prevent movement or shifting of the substance during the cutting operation.

The device or abutment is particularly adaptable for use in connection with slicing machines of the semi-electric type, that is, the type in which the knife or blade is rotated by an electric motor and the reciprocation of the carriage is manual. In this type of slicer the food support is mounted laterally relative to the carriage by means of a tension spring which urges the food or substance pusher toward a gauge plate. The gauge plate is manually set in respect to the cutting plane of the knife or blade to gauge the thickness of the slices to be cut from the substance.

The primary object of the invention is to provide a new and improved abutment or "ham support" which is adapted to engage the substance to be cut to prevent movement or shifting of the substance on the food or substance holder, particularly while slices are being cut from the substance.

Another object of the invention is to provide an abutment for holding the substance in position and prevent it from shifting, the abutment being provided wtih novel means and constructed and arranged in a particular position.

A further object is to provide an abutment which is adapted to be moved to substance engaging position and which is adapted to be automatically removed from substance engaging position when the food or substance pusher reaches a predetermined position with respect to the gauge plate.

A still further object of the invention is to provide a ham support which moves in a direction parallel to the cutting plane of the knife and which extends through a slot provided in the substance table near an edge thereof, the ham support being frictionally held in its adjusted position relative to the substance to prevent movement of the substance during the cutting of slices therefrom.

Numerous other objects and advantages will be apparent throughout the progress of the following specification.

The accompanying drawings illustrate a selected embodiment of the invention and the views therein are as follows:

Fig. 2 is a detail sectional view on the line 2—2 of Fig. 1.

Fig. 3 is a detail elevation partly in section looking in the direction of the arrows 3—3 of Fig. 2.

Fig. 4 is a detail sectional view on the line 4—4 of Fig. 2.

Fig. 5 is a detail view of the pusher plate having a lever operating cam fixed thereto.

Fig. 6 is a detail elevation of a slicing machine looking from the right-hand side of the machine toward the cutting blade, the view embodying a modified form of abutment or "ham support".

Fig. 7 is a detail plan section of the food or substance carriage and shows some of the mechanism used in connection with the abutment.

Fig. 8 is a vertical sectional view looking in the direction of the arrows 8—8 of Fig. 7 and taken on the line 8—8 of Fig. 12.

Fig. 9 is a detail elevational view looking in the direction of the arrows 9—9 of Fig. 7.

Fig. 10 is a longitudinal sectional view looking from the left-hand side of the machine toward the right-hand side thereof.

Fig. 11 is a detail elevational view, partly in section, looking in the direction of the arrows 11—11 of Fig. 10.

Fig. 12 is a detail sectional view taken on the line 12—12 of Fig. 10.

Fig. 13 is a detail elevational view, partly in section, looking from the right-hand side of the machine toward the flat side of the knife and shows a modified form of abutment or "ham support" which abutment is not automatically returned out of the path of the pusher plate but is free to be shifted manually.

Fig. 14 is a detail sectional view on the line 14—14 of Fig. 13.

Fig. 15 is a detail elevational view partly in section of a modified form of abutment and is taken on the line 15—15 of Fig. 16.

Fig. 16 is a side elevation, partly in section, of the abutment shown in Fig. 15.

Fig. 17 is a detail sectional view on the line 17—17 of Fig. 16.

Fig. 18 is a detail elevational view of another modified form of abutment.

Fig. 19 is a side elevation, partly in section, of the abutment shown in Fig. 18.

Fig. 20 is a detail sectional view of still another modified form of abutment.

Fig. 21 is a detail plan view, partly in section, showing an abutment operating through a slot in the substance support and slidably mounted on the substance support in a plane parallel to the cutting plane of the knife.

Fig. 22 is a detail sectional view looking in the direction of the arrows 22—22 of Fig. 21.

Figure 1:
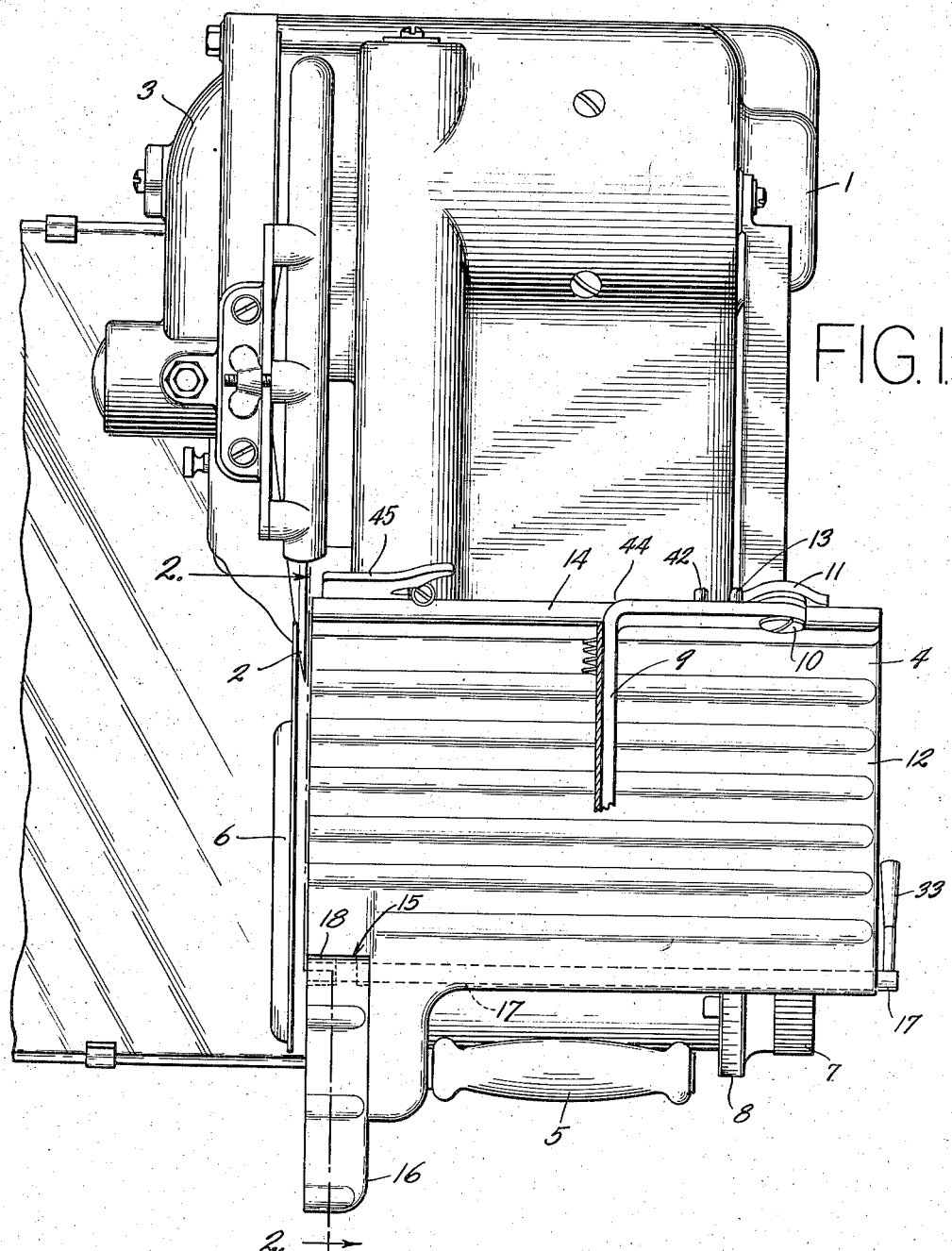
Fig. 1 is a detail plan view of a slicing machine and embodying the invention.

Referring to the drawings, and particularly to Figs. 1 to 5 thereof, 1 designates a slicing machine base upon which a slicing machine knife 2 is rotatably mounted, being rotated by a motor (not shown) arranged in a casing 3. A substance carriage 4 is adapted to be reciprocated in a plane parallel to the cutting plane of the knife, and this carriage is provided with a handle 5 for manually reciprocating the carriage. A gauge plate 6 having a face substantially in the cutting plane of the knife is adapted to be adjusted to various desired positions parallel to the cutting plane of the knife by means of an actuating wheel or knob 7. An indicator 8 cooperates with the knob or wheel 7 to indicate the thickness of the slices to be cut from the substance. The operation of the gauge plate 6 and its cooperating manually controlled knob 7 and indicating mechanism 8 is well known in this art and, therefore, further description thereof need not be made in this application.

A pusher plate 9 is pivotally supported at 10 to a sliding bearing or member 11 and is normally urged to the left, Fig. 1, by means of a spring (not shown). This spring is located beneath the substance supporting face 12 of the substance carriage 5. The pusher or pusher plate 9 is adapted to be swung on its pivot 10, there being a stop 13 mounted thereon which stop cooperates with the slide 11 to limit the position of the pusher. The pusher is adapted to be swung 180° on its pivot 10. A pusher of this type, but of a different construction, is clearly described and claimed in Patent No. 2,073,860 to Wilhelmus Adrianus Van Berkel, dated March 16, 1937, which patent is assigned to the same assignee. One form of pusher plate which is particularly adaptable for use in connection with the present invention is the pushed plate 27 shown in Figs. 1 to 3 inclusive of the aforesaid Patent No. 2,073,860.

The substance S, Fig. 2, is mounted on supporting surface 12 of the carriage 4 which is formed as a V-shaped trough, one leg of the V being the supporting surface 12 and the other leg of the V being the substance engaging surface 14.

The substance surface 12 of the carriage 4 is provided with a cut away portion 15 Fig. 1, along the knife cutting edge thereof to provide a space for an abutment 16 which is fastened to a pivot rod 17. The pivot end 18 of the abutment 16 is bifurcated and formed into round bearings which extend around the pivot rod 17 and hug this pivot rod loosely. A Z-shaped clip 19, Fig. 2, is fastened to the underside of the abutment 16 and engages an arm 20 which is bolted to the pivot rod 17 by means of a screw 21. A spring 22 is interposed between the arm 20 and the underside of the abutment 16 and presses the arm 20 against the short leg 23 of the Z-clip 19.

A pawl-wheel 24 is securely fastened to the pivot rod 17 and is engaged by a pawl 25 which is pivoted at 26 to a web 27 of the substance carriage. The lower end of the pawl 25 is fastened by a pin 28 to a longitudinally extending rod 29. This rod 29 is slidably mounted in bearings 30 formed in the substance table. A coiled spring 31 normally presses the rod 29 in the direction toward the right, Fig. 2, and thereby forces the pawl 25 into engagement with the pawl-wheel 24.

When the knob 32, which is integral with the rod 29, is manually pressed by hand toward the left, the pawl 25 will become disengaged from the pawl-wheel 24. A handle 33, for manual manipulation, is fixed to the extreme end of the pivot rod 17, and when this handle 33 is turned in a counterclockwise direction, the abutment 16 will be moved from the full line position in line with the surface 12 to the dotted line position indicated by the numeral 34, Fig. 2. When the abutment 16 is in the dotted line position shown in Fig. 2, it will be in engagement with the substance S. When the abutment 16 contacts with the substance, the compression spring 22 is slightly compressed thereby causing the arm 20 to move away from its contact point with the Z-clip 19. While the spring 22 is being compressed, the point of the pawl 25 will engage the most suitable tooth on the pawl-wheel 24 causing the abutment 16 to be resiliently held against the substance.

A suitable torsion member 35, such as a torsion spring, is fastened to the end of the pivot rod 17 in such a way that it has a tendency to turn the pivot rod 17 in a clockwise direction. Therefore, when the rod 29 is pushed to the left Fig. 2, the pawl 25 will become disengaged from the pawl-wheel 24. When the pawl 25 is disengaged from the pawl-wheel 24, the rod 17 with the abutment 16 will be rotated by the spring 35. The full line position of the abutment is shown in Fig. 2.

During the manual reciprocation of the food or substance carriage, the pusher, as it is advancing toward the gauge plate because of slices being cut from the substance and the substance becoming shorter, would naturally become engaged with and obstructed by the abutment 16 when it is in substance engaging position as indicated in dotted lines at 34 in Fig. 2. The abutment 16 would, therefore, naturally interfere with the pusher once the pusher moved into close proximity with the knife's cutting edge. Means, however, have been provided to automatically return the abutment to its normal position when the pusher plate approaches the abutment 16 in its substance engaging position. The means, therefore, causes the abutment 16 to be automatically moved from its dotted line position 34 to its normal full line position as shown in Fig. 2. As shown, the pusher is pivoted on the opposite side of the operator's side and the interference of the pusher plate with the abutment 16 can be had only with the pusher swivelled toward the knife, the position being shown in Fig. 1. The means referred to comprises a lever 36, Fig. 3, which is fastened to a pivot pin 37 on a lug 38 formed on the side of the substance table 4. The upper end of the lever 36 carries a roller 39, and from its lower end there projects an arm 40 which engages a collar 41 which is fastened to the end of the pusher rod 29. When the pusher plate 9 moves in the direction toward the cutting edge of the knife (from the left to the right, Fig. 3) a pin 42 fastened to the pusher arm 9 will run under the roller 39 and force the lever 36 in a counterclockwise direction, Fig. 2, so that the lug or arm 40 will engage the collar 41 at which time the rod 29 will disengage the pawl 25 from the pawl-wheel 24. At this disengagement the spring 35 will rotate the pivot rod 17 and return the abutment 16 from its dotted line position (substance engaging position) to its normal full line position, Fig. 2.

Instead of employing a pin 42 for engagement with the roller 39, a cam 43 fastened to the arm of the pusher plate 9, Fig. 5, may be employed to shift the arm or lever 36. However, the inclination of the arm or lever 36 is sufficient to strike the edge 44 of the pusher plate arm 9 to shift the arm or lever 36.

A stop member 45 is rigidly mounted on the substance carriage and is adapted to engage the pusher plate 9 to prevent the substance engaging teeth or prongs on the pusher plate from ever coming in contact or engagement with the knife or blade 2. In other words, this stop 45 is so positioned that regardless of the position or inclination of the pusher plate, the pusher plate will be prevented from fouling the knife.

In the slicing machine construction shown in Figs. 6 to 12 inclusive, 50 designates a slicing machine base upon which a slicing machine knife 51 is rotatably mounted, being rotated by an electric motor (not shown). A substance carriage 52 is adapted to be manually reciprocated in a plane parallel to the cutting plane of the knife. A gauge plate 53 having a face substantially in the cutting plane of the knife is adapted to be adjusted to various desired positions parallel to the cutting plane of the knife in a manner well known in the art.

A pusher plate 54 is pivotally supported at 55 to an arm 56 of a sliding bearing 57 and is normally urged toward the cutting plane of the knife by springs 58, Fig. 7, which are connected to the slidable member 57 and to a rigid part of the substance carriage 52. These springs are located beneath the substance supporting face 59 of the substance carriage 52. The pusher or pusher plate 54 is adapted to be swung on its pivot 55, there being a stop 60, Fig. 11, mounted thereon which stop cooperates with the arm 56 of the slide 57 to limit the position of the pusher plate 54. The pusher is adapted to be swung on its pivot 55.

The substance is mounted on the supporting face or surface 59 of the carriage 52 which may be in the form of a V-shaped trough, one leg of the V being the supporting surface or face 59 and the other leg of the V being the substance engaging surface 61.

An abutment or ham support 62 in the form of a round pin is fastened to a slide bearing 63 at 64 beneath the substance face or surface 59, Figs. 8 and 12. The substance face or surface 59 is provided with a slot 65 through which the abutment 62 extends. The sliding bearing 63 is slidably mounted on a longitudinal front-to-rear rod 66. The rod 66 is provided with ratchet teeth 67 approximately the full length thereof. The slide bearing 63 is provided with a slot 68, Figs. 10 and 12, in which there is provided a pawl 69 pivoted at 70 so that the pawl point 71 of this pawl will engage the ratchet teeth 67 on the rod 66 and hold the slide bearing 63 and the abutment 62 against movement toward the right, Fig. 10, after the abutment has been moved into engagement with the substance. The movement of the slide 63 with the abutment 62 in the direction toward the substance is accomplished manually against the tension of a spring 72. The spring has one of its ends fastened to the substance table at 73, Fig. 7, and its other end fastened to the slide bearing 63 as indicated at 74, Fig. 12. This spring 72 is guided over a roller 75 which is rotatably mounted on a pin 76 fixed stationarily to the substance table.

A stud 77 having a roller 78, Fig. 12, is fastened to the pawl 69. Pressure applied to the underside of the roller 78 by an arm 79, Fig. 12, will disengage the pawl 69 from the ratchet teeth 67 of the slide rod 66 and allow the slide bearing 63 with the abutment 62 to be pulled from the dotted line position shown in Fig. 10 to the full line position shown in that same figure by the tension of the spring 72. When the abutment 62 is in the full line position shown in Fig. 10, it will clear the pusher plate and offer no obstruction to the advancement of the pusher plate, and the pusher plate is free to advance closely to the cutting edge of the knife. The invention, however, is designed to prevent interference of the movement of the pusher plate by the abutment when the pusher plate advances toward the cutting plane of the knife. The pawl disengaging arm 79 is in the form of a long shelf which reaches approximately across the width of the substance table from a point adjacent the pawl roller 78 to a point indicated by the numeral 80, Fig. 7. The shelf or arm 79 is fastened by screws 81 to a shaft 82, Fig. 12, which is journalled in the walls of the substance table and projects on each side of the substance table a sufficient distance to be actuated by a hand lever 83 on the operator's side of the machine. On the end of the rod opposite to the end to which the lever 83 is mounted there is mounted an arm 84, Fig. 10. Movement in a counter-clockwise direction of either the arm 84 (see Fig. 11), or the handle 83 will cause the shelf or arm 79 to lift the pawl 69 and disengage it from the teeth 67 on the rod 66. A spring 85 is mounted on the shaft 82 and has one end thereof anchored to the arm 84 and the other end to the substance table to forcibly urge the shaft 82 in a clockwise direction, see Fig. 11, against the movement of arm 84 or the handle 83. The oscillation of the shaft 82, Fig. 9, is limited by stop pins 86 and 87. Normally the handle 83 will abut against the stop pin 86, and when the pawl is to be released, the handle is turned from the pin 86 toward the pin 87. The stop pin 86 in Fig. 9 is shown a short distance away from the handle 83 in order to allow for a small clearance between the shelf or arm 79 and the roller 78.

The automatic feature for disengaging the pawl 69 is operable only when the pusher plate is turned toward the knife cutting edge, and this automatic feature to return the abutment 62 to its normal full line position as shown in Fig. 10, includes mechanism comprising an arm 88, Fig. 11, which is pivotally connected at 89 to a bracket 90. The arm 88 is provided with a cam surface 91 which is adapted to be engaged by a roller 92 on the arm 93 of the pusher plate 54. An arm 94 is pushed downwardly by the arm 88 when the roller 92 on the pusher plate engages the cam surface 91 during the movement of the pusher plate toward the cutting plane of the knife. The downward movement of the arm 88 is transmitted by the connecting rod 94 to the arm 84 on the shaft 82, thereby giving the shaft 82 a part turn. This part turn of the shaft 82 moves the shelf or arm 79 and disengages the pawl 69, thereby permitting the spring 72 to move the slidable bearing 63 and the connected abutment from the dotted line position shown in Fig. 10 to the full line position. This movement occurs just prior to the time the face of the pusher plate would engage the abutment when it is in its dotted line position or any position within the plane of the movement of the pusher plate.

To assist in keeping the pawl point 71 into its normal engagement with the teeth 67 on the rod 66, a spring 95, Fig. 10, may be positioned as shown in that figure.

Another way of holding the movable abutment in proper position is shown in Fig. 8. In this figure the abutment 62 is provided with a tooth 96 formed on the bottom thereof which engages the teeth on an arm or shelf 97.

Abutments of the type herein disclosed are especially useful on slicing machines in combination with a gauge plate and knife guard plate and a feeding device which continuously presses the substance against the gauge plate and knife guard plate. The use of these abutments or ham supports prevents dislocation of the substance from its cutting position on the cutting stroke of the substance table. However, these abutments are not limited to use only on machines of this particular type.

On semi-electric machines, that is, machines having a motor operated knife and a manually operated carriage and with which no substance clamp is mounted, it is desirable to use a V-shaped substance table so that the substance can be placed in the bottom of the V to insure a first full slice from the substance due to the proper centering of the substance in regard to the substance carriage and the knife. The main face of the surface of the V-trough also takes up the cutting reactions. The substance capacity of the slicing machine, however, increases as the supporting surface approaches the horizontal line based on a minimum knife diameter and minimum stroke of the table and therefore minimum length of the machine.

The abutments which have been described above assist in supporting the substance in proper position relative to the food carriage and the cutting knife. These abutments also prevent dislocation of the substance in respect to the substance holder. The abutments are automatically operable when the pusher plate reaches a predetermined position to move the abutments out of the path of the pusher plate. As the substance on the substance table diminishes in length, due to slices being cut therefrom, the tendency of the substance to become dislocated during reciprocal movement of the carriage continually diminishes or decreases. The arm or shelf 97 is fixed to a rod 82' and is normally urged in a predetermined position by a spring 85', Fig. 8.

The abutments shown in Figs. 13 to 23 inclusive are of the non-automatic type, that is, they are not automatically returned to their normal non-operative position when engaged by the pusher plate. The slicing machine shown in Fig. 13 has a base 100 upon which a carriage 101 is adapted for fore-and-aft reciprocation, the reciprocation being caused manually. The carriage 101 includes a substance or food supporting surface 102. The carriage 101 is of the flat type but the invention is equally adaptable for food tables of the V-type. A gauge plate 103 is used in connection with the slicing machine and this gauge plate lies adjacent the cutting edge of the knife 104. The operation and construction of the gauge plate has been previously described and is well known in the art to which the present invention pertains. A pusher plate 105 having a pusher plate arm bracket 106 is adapted for lateral movement with respect to the food supporting carriage to urge the substance S normally toward the gauge plate and the cutting plane of the knife. The urging action of the pusher plate is affected by springs 107 located beneath the food or substance supporting surface 108 of the food carriage. These springs are fastened to the pusher plate bracket 106 and to a part of the carriage. An abutment member 109 is adapted for engagement with the substance S to hold the substance in proper position with respect to the carriage gauge plate and knife and to prevent lateral movement or shifting of the substance on the carriage during the reciprocation of the carriage across the base. The abutment comprises an angle-shaped guide rod 110 having its vertical member 111 fastened stationary to the side of the substance table in any convenient manner, such as by screws 112. The horizontal member 113 of the abutment serves as a support for a slide bearing 114 which is adapted to be pushed manually toward or away from the vertical member 111. A set screw 115 is threaded into the slide bearing 114 and its point is adapted to engage a slot 116 cut along the surface of the horizontal member 113. The point of the screw 115 and the slot 116 cooperate to prevent rotation of the slide bearing 114 on the horizontal guide member 113. An abutment rod 117 of suitable shape projects downwardly from a boss 118 which is formed integral with the slide bearing 114. When the slide 114, Figs. 13 and 14, with the abutment 117 is moved against the side of the substance S and locked by the set screw 115 on the guide 113, the substance is prevented from moving laterally during the reciprocation of the substance table.

If substance S, narrower than that shown in Fig. 13, is being cut, the abutment 117 is manually released before the pusher plate has moved into contact with the abutment rod 117. Since the abutment 117 cannot revolve on the slidable guide 114, the pusher plate would merely be stopped by the abutment if it had been neglected by the operator to move the abutment to its end position out of the way of the pusher plate. A washer 119 and a screw 120 limit the movement of the slide 114 in the one extreme direction. In Fig. 13 there is also shown an angle plate 121 which is adapted to cooperate with the carriage. This angle plate has a vertical leg 122 and a horizontal leg 123. The horizontal leg 123 is removably engaged with the carriage and may have lateral slidable movement with respect to the carriage. This angle plate has no relation with the abutment member 109 but may be used when the abutment construction 109 is not employed.

Figs. 15 to 17 inclusive show a different type of abutment rod which is adapted to cooperate with the angle member 110 shown in Figs. 13 and 14. In these latter figures a slide block 124 is adapted to be manually slid along the horizontal member 113. An abutment rod 125 is pivoted at 126 to the slide member 124. The width of the upper end 127 of the abutment rod 125 is substantially the same as the width of the slot 116 and is adapted to fit into this slot and be guided thereby. The pivotal movement of the abutment 125 is limited in one direction by the point 128 of the upper end 127 and in the other direction by a stop pin 129. A small plunger 130 is inserted in a recess in the abutment 125 and is pressed against the bottom of the slot by a spring 131. This spring keeps the abutment 125 against the pin 129 and causes a slight friction between the plug 130 and the slot 116. When the slide member 124 with the abutment 125 is moved against the substance S, a larger frictional force is created between the horizontal part 127 and the bottom of the slot 116 by the reaction of the substance and the long vertical contact lever arm of the abutment 125. This frictional force automatically locks the abutment. It can readily be seen therefore that the abutment 125 is free to be pushed manually into contacting relationship with the substance S and locked in position by the tilting action of the abutment rod which causes a binding action between the corner 128 and the bottom of the slot 116. When it is desired to release the abutment rod from the substance, the abutment 125 may be returned to its normal vertical unlocked position by pulling on the projection 125' and then sliding it along the rod.

Figs. 18 and 19 disclose still another modified form of abutment rod which is adapted to slide on the horizontal member 113 of the angle-shaped rod 110. The abutment 140 is pivoted at 141 to an extension 142 of the slide bearing 143 which is slidably mounted on the horizontal rod 113. The upper end 144 of the abutment rod 140 is substantially the same width as the slot 116 and is adapted to extend within this slot and be guided thereby. An opening 145 is provided in the abutment rod 140 and is adapted to receive a pin 146 which is smaller in size than the size of the opening 145. Therefore, the abutment 140 is adapted to have restricted or limited movement with respect to the slide 143. A small plunger 147 is inserted in a recess in the abutment 140 and is pressed against the bottom of the slot 116 by a spring 148. This spring action keeps the abutment 140 against the pin 146 as shown in Fig. 19 and causes a slight friction between the plug 147 and the bottom of the slot 116. When the slide 143 with the abutment 140 is moved against the substance, a larger frictional force is created between the part 149 of the abutment and the bottom of the slot 116 by the reaction on the substance and the long vertical contact lever arm of the abutment 140. When the abutment 140 is in engagement with the substance, the abutment arm 140 is tilted or locked with respect to its pivot 141 and causes a binding action between the bottom of the slot and the upper part 149 of the abutment rod 140. To release the locking or cam action between the abutment rod 140 and the bottom of the slot 116 opposing pressure on the surfaces 150 and 151 on the abutment rod 140 and the extension 142 respectively releases this binding action and permits free slidable movement of the abutment rod.

An outstanding pin 152 is formed on the abutment rod 140 and is adapted to prevent the teeth 153 on the pusher plate 105 from fouling the abutment arm 140. This pin 152 is positioned so that it will be above the uppermost row of teeth 153.

In Fig. 20 a slidable bearing 160 is adapted to slide on the horizontal member 113 of the angle member 110. An abutment rod 161 is pivoted at 162 to the slidable member 160. A trigger or pawl 163, having a pawl engaging tooth 164, is adapted to engage any one of a number of teeth 165 formed in the bottom of the member 113, particularly in the bottom of the slot 116. The pawl 163 is pivoted at 166 to an arm or extension 167 on the slidable member 160. A plunger 168 is arranged in a recess in the abutment rod 161 and a spring 169 normally urges the plunger upwardly into contacting relationship with the pawl 163 to normally keep the pawl into engagement with a proper tooth 165. The angularity of the teeth 165 and the tooth 164 on the pawl 163 is such that the abutment rod 161 is free to be pushed in one direction, the direction being toward the substance. Reverse movement of the abutment 161 is prevented due to the locking action of the ratchet teeth and pawl. When it is desired to release the abutment rod 161 from the substance, the end 170 of the trigger is pressed, such as by squeezing, and the pawl will become disengaged from the teeth. In this latter position the slide member 160 and its cooperating abutment 161 is free to be moved in either direction on the horizontal rod 113.

Figure 23:
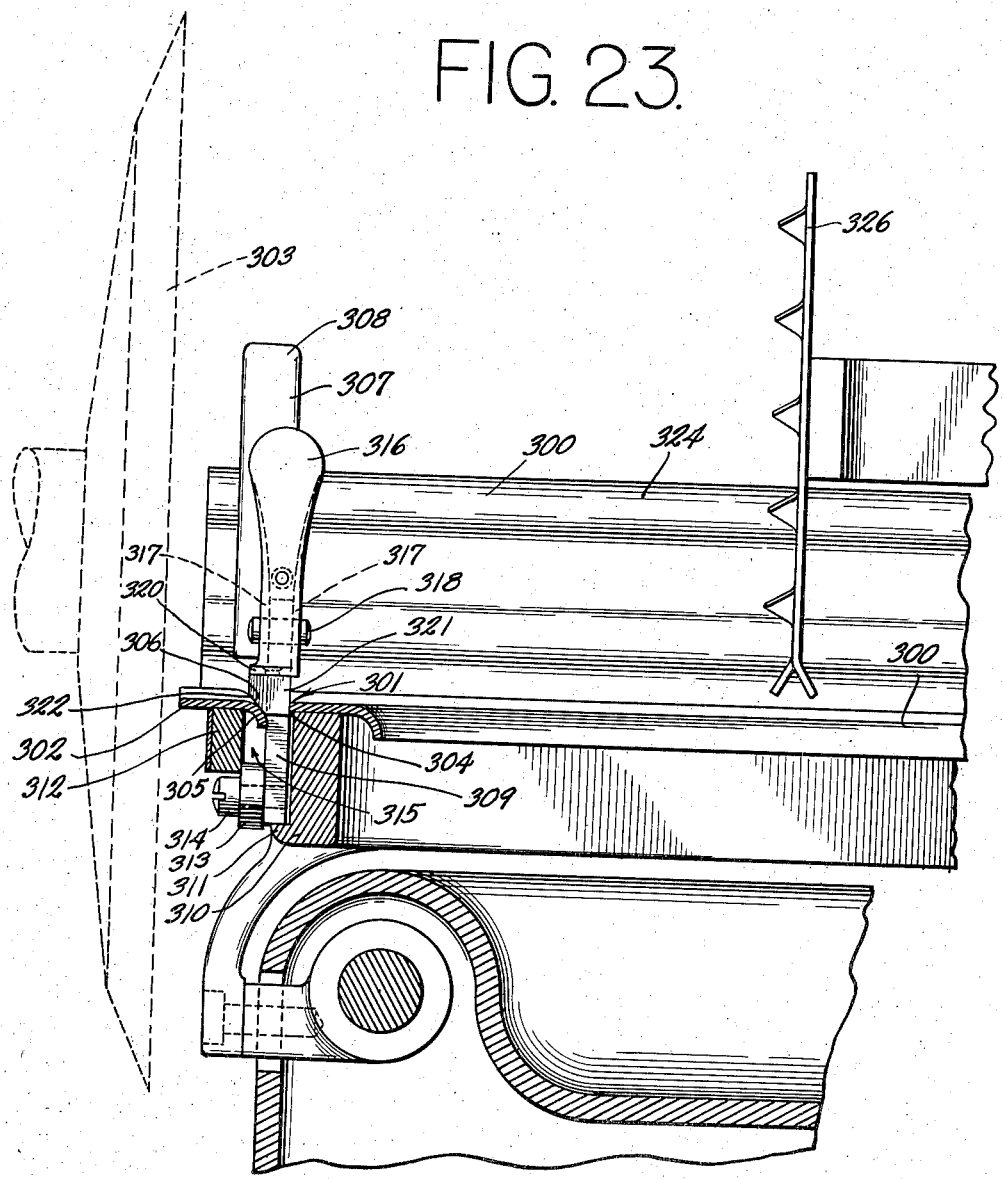
Fig. 23 is a detail sectional view on the line 23—23 of Fig. 21.

A novel slidable abutment is shown in Figs. 21 to 23 inclusive. In these latter figures the slicing machine substance holder or support 300 is provided with a slot 301 near the edge 302 of the substance support. The slot extends in a direction parallel to the cutting plane of the slicing machine knife 303. The material surrounding the slot on the inner side is relatively straight and flat as indicated at 304, Fig. 23, and is curved at its outer side at 305 to provide a substantially rounded surface 306. An abutment member 307 is adapted to operate in the slot 301 and this abutment comprises a vertical rigid portion 308 extending upwardly through the slot 301 and rigidly connected to a horizontal lower portion 309. The portion 309, Fig. 23, is slidably mounted on and supported by the carriage member 310 which is formed to receive the member 309 and which has an extending bottom lip 311 which supports the bottom edge of the lower member 309. A rigid bar 312 is mounted on the opposite side of the abutment member between the edge 305 of the slot and the edge 302 of the substance table. Rollers 313 are revolubly fastened to the lower portion 309 by fastening members 314. The rollers 313 occupy the space 315 between the lower member 309 and the bar 312 and prevent lateral or side movement or shifting of the abutment member. The heads of the fastening members 314 are arranged immediately below the rod or bar 312 and prevent undue movement of the abutment member in an upward direction. Downward movement of the abutment member is prevented by the lip 311. Therefore, the abutment is free to slide forwardly and rearwardly in the slot 301, movement in other directions except forwardly and rearwardly in the slot 301 being limited by the parts just described.

A lever arm 316 is provided with ears 317. A pin 318 passes through the ears 317 and through the part 308 of the abutment member and pivotally connects the lever arm 316 to the vertical portion 308 of the abutment member. The lower end of the lever arm 316 is bent at 319, Fig. 22, to provide a flat portion 320 which is substantially parallel with the substance table 300. A friction shoe 321 is rigidly secured to the portion 320 and is adapted for engagement with the material surrounding the groove 301. The shoe 321 has a flat or arcuate surface 322, Fig. 23, to frictionally engage the arcuate or curved surface 306 to frictionally hold the abutment member in various positions on the substance table to impinge substance (not shown) against the engaging abutment edge 323 and the forward support 324, Fig. 22. The shoe 321 and its engagement with the material at the slot 301 is so constructed and arranged that the abutment member 307 is free to be moved in a direction away from the operator without operating the lever arm 316. Movement in a rearward direction, that is, toward the operator is restricted by the frictional engagement of the shoe 321. Therefore when it is desirable or necessary to retract the abutment member to release the substance or for any other reason, the lever arm 316 may be pressed to the left, Fig. 22, to bring the shoe 321 out of frictional engagement with the arcuate surface 306 at which time the abutment member is freely slidable in either direction. A convenient way to operate the lever arm 316 is to apply a squeezing pressure against the lever arm 316 and the upstanding rigid portion 325 on the abutment member at which time the lever arm will swing on its pivot 318 because the member 325 is rigid with the abutment member. The member 325 is also used for the purpose of sliding the abutment member along its track in the groove 301. This form of abutment is highly advantageous in that in substance engaging position it is relatively close to the action of the knife and supports the substance even when the substance is relatively short. The slidable abutment can be readily and quickly maneuvered and when not desired for use can be removed to the far end of the slot toward the operator at which position it will be out of the way for normal operation of the slicing machine when the abutment is not to be used. A substance pusher 326 of the type previously described in this application is adaptable for use in advancing the substance toward a gauge plate of the type shown in various figures for advancing the substance to the cutting plane of the knife.

The invention provides for the use of an abutment for engagement with the substance to be sliced to permit lateral movement or shifting of the substance during the slicing operation. The various forms of abutments herein shown and described have been found very satisfactory. One form of abutment which may be used with slicing machines of various types is that in which the abutment is automatically returned to normal initial position when the gauge plate approaches the abutment. Other forms of abutments herein disclosed are also applicable to various types of machines and while they are not automatically removable to initial position, they may be so removed or positioned manually. All the abutments herein shown are positive and efficient in operation, can be attached readily to existing machines and can be readily and economically manufactured.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In a slicing machine having a reciprocal carriage, a slicing knife, a gauge plate operable in a plane parallel to the cutting plane of the knife and a pusher plate to advance the substance toward the gauge plate, the combination of a shiftable abutment adapted to engage the substance to hold the substance in position and prevent shifting thereof during the slicing operation, spring means for normally urging the abutment to initial non-operative position, means operating against the urging action of said spring to hold the abutment in substance engaging position, and means operatively associated with the advancing means and contacting with a portion of the abutment holding means when the advancing means is located in a predetermined portion of its travel for releasing said last named means whereby said spring means will return the abutment.

2. In a slicing machine having a reciprocal carriage, a slicing knife, a gauge plate operable in a plane parallel to the cutting plane of the knife and a pusher means to advance the substance toward the gauge plate, the combination of a shiftable abutment adapted to engage the substance to hold the substance in position and prevent shifting thereof during the slicing operation, spring means for normally urging the abutment to normal non-substance engaging position, ratchet and pawl means for preventing the spring means from returning the abutment to normal initial position, and means having operative association with the advancing means and actuating the ratchet and pawl means when the advancing means is located in one portion of its travel to release the pawl from the ratchet and permit the spring means to return the abutment to normal initial non-substance engaging position.

3. In a slicing machine having a reciprocal carriage, a slicing knife, a gauge plate operable in a plane parallel to the cutting plane of the knife and a pusher plate to advance the substance toward the gauge plate, the combination of an abutment adapted to be shifted to engage the substance to hold the substance in position and prevent shifting thereof during the slicing operation, spring means for normally urging the abutment to normal non-substance engaging position, ratchet and pawl means for preventing the spring means from returning the abutment to normal initial position, means arranged in the path of movement of the pusher plate, said means being operated by the pusher plate during movement of the pusher plate, the operation of said means causing disengagement of the pawl and ratchet, said spring means returning the abutment to normal initial position when the pawl and ratchet are disengaged.

4. In a slicing machine having a reciprocal carriage, a slicing knife, a gauge plate operable in a plane parallel to the cutting plane of the knife, and a pusher plate means to advance the substance toward the gauge plate, the combination of a shiftable abutment adapted to engage the substance to hold the substance in position and prevent shifting thereof during the slicing operation, means for holding the abutment in substance engaging position, means for releasing the abutment holding means, means operatively connected to the abutment to return the abutment to normal inoperative position, and means mounted on the abutment releasing means to allow release of said abutment holding means when the advancing means is located in one portion of its travel whereby to permit said returning means to return the abutment to normal inoperative position.

5. In a slicing machine having a reciprocal carriage, a slicing knife, and a feeder member on the carriage to advance substance toward the cutting plane of the knife, the combination of an abutment adapted to be shifted to engage the substance to hold it in position and prevent shifting thereof during the slicing operation, means for locking the abutment in substance-holding position, and resilient means interposed between the abutment and said locking means whereby said abutment is resiliently thrust against the substance while said locking means remains in operative position.

6. In a slicing machine having a reciprocal carriage, a slicing knife, and a feeder member on the carriage to advance substance toward the cutting plane of the knife, the combination of an abutment adapted to be shifted to engage the substance to hold it in position and prevent shifting thereof during the slicing operation, means for locking the abutment in substance-holding position, means for returning said abutment to normal inoperative position upon release of said locking means, and resilient means interposed between the abutment and said locking means whereby said abutment is resiliently thrust against the substance while said locking means remains in operative position.

7. In a slicing machine having a reciprocal carriage, a slicing knife, a gauge plate operable in a plane parallel to the cutting plane of the knife, and a pusher plate to advance the substance toward the gauge plate, the combination of an abutment adapted to be shifted to engage the substance to hold the substance in position and prevent shifting thereof during the slicing operation, means for holding the abutment in substance engaging position, means connected to the abutment to return the abutment to normal inoperative position, and means having operative association with the pusher plate for releasing said holding means to permit said returning means to return the abutment to normal non-substance engaging position when the advancing means is located in one portion of its travel.

8. In a slicing machine having a reciprocal carriage for supporting substance to be sliced, means for advancing the substance toward the cutting plane of the knife to have a slice cut therefrom, an abutment shiftable to substance supporting position to engage the rear side of the substance and prevent movement or shifting of the substance during the slicing operation, means to hold the abutment in said position, means normally urging the abutment to non-supporting position, and means mounted on the advancing means and contacting with a portion of the abutment holding means when the advancing means is located in one portion of its travel to release said abutment holding means.

9. In a slicing machine having a reciprocal carriage, a slicing knife, a gauge plate operable in a plane parallel to the cutting plane of the knife, and a pusher plate to advance the substance toward the gauge plate, the combination of an abutment adapted to be manually shiftable to engage the rear side of the substance to prevent movement or shifting of the substance during a slicing operation, means to hold the abutment in said position, means to return the abutment to its normal inoperative non-engaging position, and means mounted on the advancing means and contacting with a portion of the abutment holding means when the advancing means is located in one portion of its travel to release said abutment holding means.

10. In a slicing machine having a reciprocal carriage, a slicing knife, a gauge plate operable in a plane parallel to the cutting plane of the knife, and a pusher plate to advance the substance toward the gauge plate, the combination of an abutment adapted to be shifted to engage the substance to hold the substance in position and prevent sifting thereof during the slicing operation, means for normally urging the abutment to initial non-operative position, means operating against the urging action of said spring to hold the abutment in substance engaging position, and means mounted on the pusher plate and contacting with a portion of the abutment holding means when the advancing means is located in one portion of its travel to release said abutment holding means.

11. In a slicing machine having a slicing knife, a reciprocal carriage, a rigid abutment on the carriage, against which substance on the carriage is engaged, a gauge plate operable in a plane parallel to the cutting plane of the knife, and a pusher plate operable in a plane perpendicular to the cutting plane to advance the substance toward the gauge plate, the combination of a fixed support rod overhanging the carriage, an elongated vertically extending movable smooth-faced abutment, and means for non-rotatably securing the upper end of said movable abutment to the support rod for slidable movement thereon whereby said movable abutment may be moved toward the rigid abutment to impinge substance thereagainst, said securing means comprising a longitudinal slot in the support rod and a manually operable thumb screw on the movable abutment engageable in said slot.

12. In a slicing machine, a reciprocal carriage, a slicing knife, a pusher plate support mounted on said carriage for movement toward the cutting plane of the knife, a pusher plate pivoted to said support for movement thereon to a plurality of operative substance engaging positions, a shiftable abutment movable from an inoperative position to an operative position wherein it engages the substance to hold the substance in position and prevent shifting of it during the slicing operation, means mounting the abutment for such shiftable movement, means tending to restore the abutment from operative to inoperative position, means normally restraining said restoring means, and means operatively associated with the pusher plate and engageable with the restraining means at a predetermined position of the pusher plate during its movement toward the cutting plane when in one of its operative substance engaging positions to release said restraining means and permit the restoring means to return the abutment to inoperative position.

13. In a slicing machine having a reciprocal carriage, a slicing knife, a substance support, and a feeding member for moving substance toward the cutting plane of the knife, a fixed abutment at one side of the carriage, a manually shiftable abutment at the other side of the carriage adapted to be shifted from inoperative to operative substance engaging position to impinge the substance against the fixed abutment and prevent movement or shifting of the substance during the slicing operation, a substance engaging projection on the free end of said abutment, said abutment being pivoted at its other end about an axis perpendicular to the cutting plane of the knife and in the plane of the substance support for movement to bring the substance engaging projection to a substance engaging position overlying the substance support between said axis and said fixed abutment, and a latch for releasably securing the movable abutment in any one of a plurality of substance engaging positions to which it may be moved.

14. In a slicing machine having a reciprocal carriage for supporting substance to be sliced, means for advancing the substance toward the cutting plane of the knife to have a slice cut therefrom, a shiftable abutment movable from an inoperative position to a substance supporting position to engage the rear side of the substance and prevent movement or shifting of the substance during the slicing operation, means mounting the abutment for such shiftable movement, means tending to restore the abutment to inoperative position, holding means normally restraining the restoring means from operation, and means operatively associated with the advancing means and contacting with said holding means at a predetermined position of the advancing means in its movement toward the cutting plane to automatically release the holding means and permit the restoring means to move the abutment to inoperative position.

15. In a slicing machine having a reciprocal carriage, a slicing knife, a gauge plate operable in a plane parallel to the cutting plane of the knife, and a pusher plate to advance the substance toward the gauge plate, the combination of an abutment adapted to be manually shifted from an inoperative position to a position to engage the rear side of the substance to prevent movement or shifting of the substance during the slicing operation, means mounting the abutment for such shiftable movement, means tending to restore the abutment to inoperative position, means normally holding the restoring means from operation, and means operatively associated with the pusher plate and cooperating with the holding means at a predetermined position of the pusher plate in its movement toward the cutting plane for automatically releasing the holding means and permitting the restoring means to restore the abutment to inoperative position.

16. In a slicing machine having a reciprocal carriage, a slicing knife, a gauge plate operable in a plane parallel to the cutting plane of the knife, and a pusher plate to advance the substance toward the gauge plate, the combination of an abutment, means mounting the abutment for shiftable movement from an inoperative position to a position to engage the rear side of the substance to prevent movement or shifting of the substance during the slicing operation, means to return the abutment to its inoperative position, and means operatively associated with the pusher plate to automatically actuate the returning means at a predetermined position of the pusher plate in its travel toward the cutting plane.

17. In a slicing machine having a reciprocal carriage, a slicing knife, a gauge plate operable in a plane parallel to the cutting plane of the knife, and a pusher plate to advance substance toward the gauge plate, the combination of an abutment adapted to be manually shifted from an inoperative position to a position to engage the rear side of the substance to prevent movement or shifting of the substance during the slicing operation, means mounting the abutment for such shiftable movement, means normally holding the abutment in substance engaging position, means connected to the abutment for releasing the abutment from said holding means and for moving it to inoperative position, and means mounted on the pusher plate for operating said releasing and moving means at a predetermined position of the pusher plate in its travel toward the cutting plane.

18. In a slicing machine having a reciprocal carriage, a slicing knife, a gauge plate operable in a plane parallel to the cutting plane of the knife, and a pusher plate to advance the substance toward the gauge plate, the combination of an abutment adapted to be manually shifted from inoperative position to a position to engage the substance to hold the substance in position and prevent shifting thereof during the slicing operation, means mounting the abutment for such shiftable movement, a spring operatively connected to the abutment for returning the abutment to inoperative position, a latch normally holding the spring from operation, and means operatively associated with the pusher plate for releasing the latch at a predetermined position of the pusher plate in its path of travel toward the cutting plane.

19. In a slicing machine having a knife, a substance support reciprocable along a path parallel to the cutting plane of the knife, said substance support having its forward edge in juxtaposition to the cutting plane of the knife and having a slot therein adjacent said forward edge, a fixed abutment extending along the support transversely with respect to the cutting plane, a shiftable abutment slidably mounted in said slot for movement toward and from said fixed abutment, said shiftable abutment having a substance engaging surface extending transversely with respect to the cutting plane, means on said substance support for restraining said shiftable abutment against movement transversely of said slot, a lever pivoted intermediate its ends to said shiftable abutment and having at its lower end a friction shoe operatively engaging the surface of said substance support for restraining said shiftable abutment against movement relative to said substance support, the upper end of said lever forming means for manually releasing said friction shoe from said substance supporting surface, and said shiftable abutment having a finger grip adapted to cooperate with the upper end of said lever for manually moving said shiftable abutment along said slot.

JOSEPH FOLK.